United States Patent [19]

Lantzy et al.

[11] Patent Number: 5,618,000
[45] Date of Patent: Apr. 8, 1997

[54] ROOT-WATERING SYSTEM

[75] Inventors: John P. Lantzy, North East; Calvin S. Cook, Erie, both of Pa.; William A. McNeice, Oakville, Canada

[73] Assignee: US Designs, Northeast, Pa.

[21] Appl. No.: 322,869

[22] Filed: Oct. 12, 1994

[51] Int. Cl.$^6$ .......................... A01G 29/00; B05B 15/00
[52] U.S. Cl. .......................... 239/276; 47/48.5; 111/7.1
[58] Field of Search .......................... 239/276; 47/48.5; 111/7.1–7.4

[56] References Cited

U.S. PATENT DOCUMENTS

| | | | |
|---|---|---|---|
| 1,925,622 | 9/1933 | Anderson | 111/7.1 |
| 1,984,265 | 12/1934 | Hamer | 47/48.5 |
| 2,333,727 | 11/1943 | Lucas | 239/276 X |
| 2,850,992 | 9/1958 | Hooper et al. | 47/48.5 X |
| 2,875,713 | 3/1959 | Shoffner | 47/48.5 X |
| 2,885,977 | 5/1959 | Fabus | 47/48.5 X |
| 4,170,948 | 10/1979 | Strickland, Jr. | 47/48.5 X |
| 4,745,706 | 5/1988 | Muza et al. | 47/48.5 X |
| 5,287,994 | 2/1994 | Dempsey | 47/48.5 X |

FOREIGN PATENT DOCUMENTS

| | | | |
|---|---|---|---|
| 226062 | 6/1958 | Australia | 111/7.1 |
| 798638 | 11/1968 | Canada | 111/7.1 |

*Primary Examiner*—Lesley D. Morris
*Attorney, Agent, or Firm*—Richard K. Thomson

[57] ABSTRACT

A root-watering system which is attachable to a valved water supply. The system includes a plastic tube with a threaded coupling for attachment to a spray nozzle. A stake connects to the opposite end of the tube and may be inserted into the soil using a foot pedal to bring a stream-directing slot into the vicinity of the plant's roots. A V-shaped barrier protects the slot from being packed with soil.

10 Claims, 1 Drawing Sheet

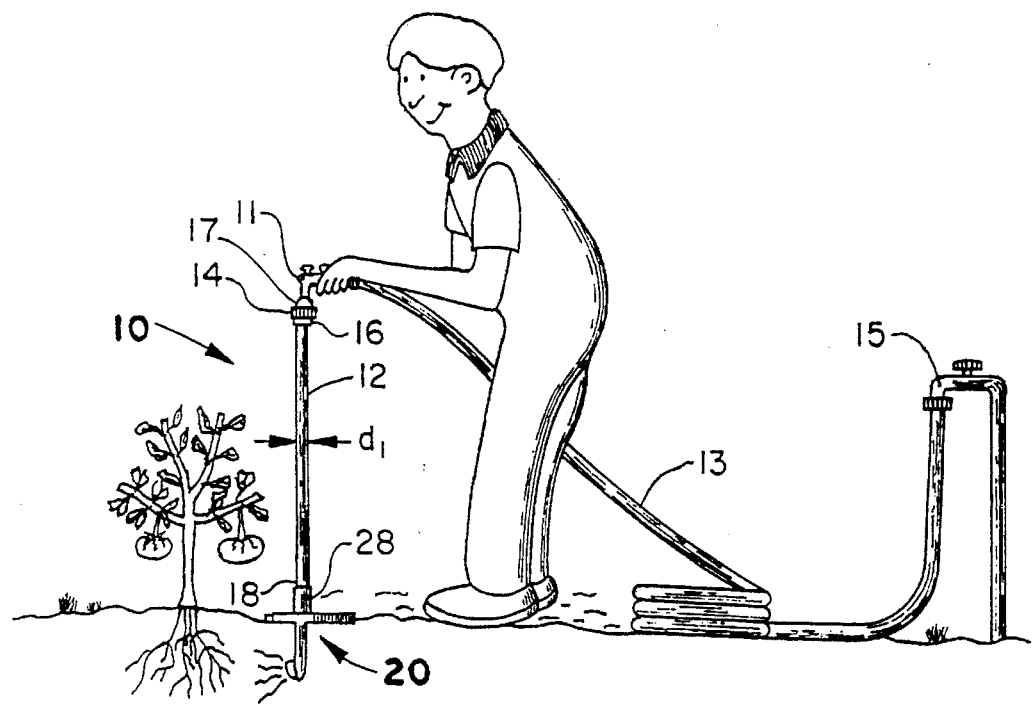
FIG. 1
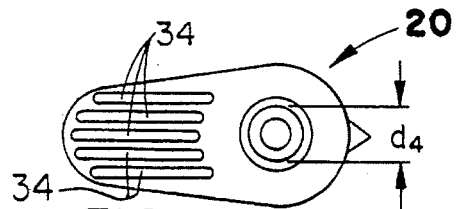
FIG. 2B
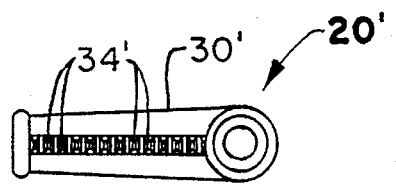
FIG. 3B
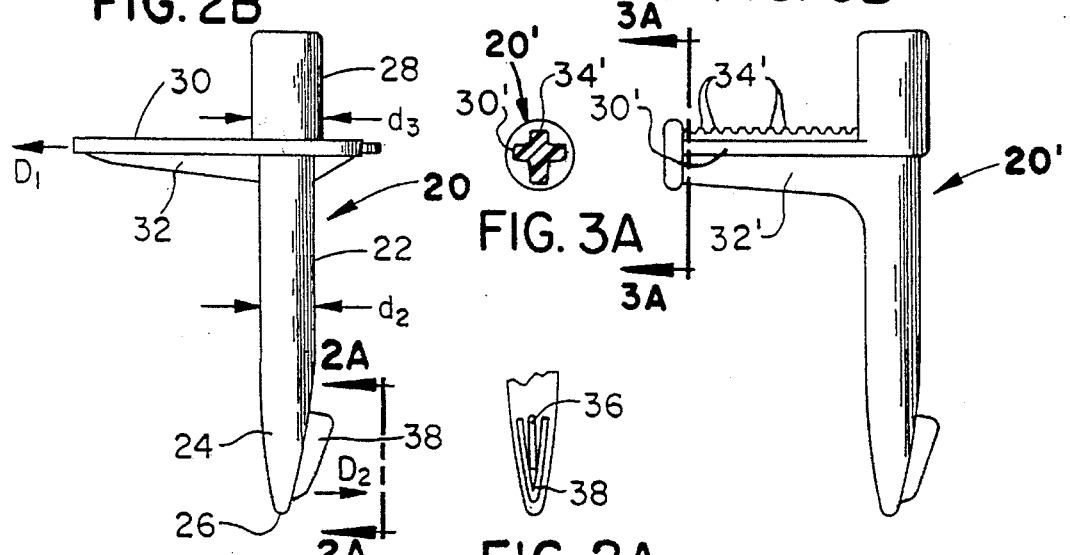
FIG. 2
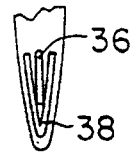
FIG. 2A
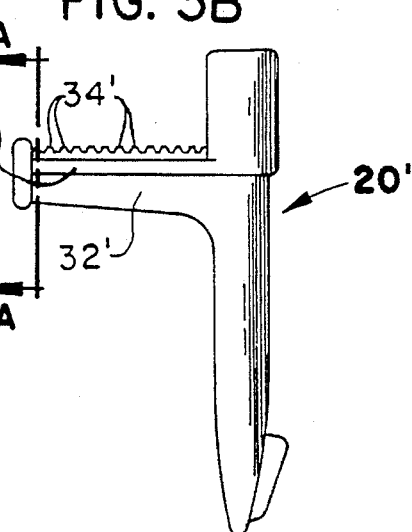
FIG. 3A
FIG. 3

ROOT-WATERING SYSTEM

FIELD OF THE INVENTION

The present invention is directed to a root-watering system. More particularly, the present invention is directed to an inexpensive foot-operable stake and rigid tube that can be attached to a hand-operable valve, such as a spray nozzle, and used to sequentially deliver water to the roots of a plurality of plants.

BACKGROUND AND SUMMARY OF THE INVENTION

Watering of plants such as trees, flowers, shrubs and garden plants can consume a considerably large amount of both time and water. Since surface watering systems deliver water to the general area of the plant, rather than specifically to the root system, much more water and time is required to deliver the water in sufficient quantities to allow for run off, misdirected flow, etc.

A number of systems have been developed to deliver water to the roots of plants. Several of the systems are designed to be fixedly installed adjacent the tree or other plant so that a large number of such devices are required to water all the plants of a typical garden. Still other systems are designed to deliver fertilizer or other nutrients to the roots, in addition to periodic quantities of water. Such systems can become unduly complex and add unnecessary cost to a root-watering system.

The root watering system of the present invention is a simple, inexpensive system which permits sequential watering of individual plants in which water is delivered directly to the roots of those plants. The system is designed for use with a hand-operable valve system such as a conventional spray nozzle. The system includes a rigid tube with a threaded attachment at a first end for connection to the end of the spray nozzle; and, a watering stake attached to the outlet end of the tube, the stake including a foot-operable pedal extending laterally outwardly, a tapered outlet end with an egress slot having a relative position with respect to the pedal (diametrically opposed, for example) so that the pedal can be used to direct the outlet stream flow direction. The outlet slot preferably has a protective deflector positioned below and extending along both sides of the opening, to prevent soil from packing into the slot.

Various features, advantages and characteristics of the present invention will become apparent after a reading of the following detailed description.

BRIEF DESCRIPTION OF THE DRAWING

The following figures depict several embodiments of the present invention, like elements bearing like reference numerals, in which:

FIG. 1 is a schematic depiction of the root-watering system in use;

FIG. 2 is a side view of a first embodiment of the stake portion of the present invention;

FIG. 2A is a front view of a portion of the first embodiment as seen along line 2A—2A of FIG. 2;

FIG. 2B is a top view of the first embodiment of the stake;

FIG. 3 is a side view of a second embodiment of the stake of the present invention;

FIG. 3A is a cross-sectional view of the second embodiment as viewed along line A—A in FIG. 3; and FIG. 3B is a top view of the second embodiment.

DETAILED DESCRIPTION OF THE PREFERRED EMBODIMENTS

The root-watering system of the present invention is depicted in FIG. 1 generally at 10. The root-watering system 10 is adapted for use with a valved water supply such as a conventional spray nozzle 11, a pistol-type spray nozzle, for example, attached to garden hose 13 which, in turn, is attached to spigot 15. The system 10 includes a rigid tube 12 and a foot-operable stake 20. Rigid tube 12 has a threaded receptacle 14 on it upper end 16 which connects to the outlet 17 of spray nozzle 11 as by threading or the like. Tube 12 may, for example, be on the order of 3' to 3 and ½ feet in length. Upper end 16 of tube 12 has an outwardly extending flange (not shown) which is captured by receptacle 14 and provides a seat for a conventional washer. Rigid tube 12 is preferably made of a plastic material such as a polyvinyl chloride (pvc). Tube 12 has an inside diameter (not shown) and an outside diameter $d_1$.

A first embodiment of foot-operable stake 20 (FIGS. 2, 2A and 2B) includes a first generally cigar-shaped portion with a cylindrical section 22 which has an outside diameter $d_2$ and a tapering section 24 which tapers to blunt leading end 26. A second cylindrical section 28 abuts the first cylindrical section 22 and has an outer diameter $d_3$ and an inner diameter $d_4$ which is slightly larger than the outer diameter $d_1$ of tube 12 to snugly receive the output end 18 thereof.

Foot-operable pedal 30 surrounds the juncture of sections 22 and 28 and extends generally outwardly from those sections predominantly in a first direction $D_1$. A reinforcing rib 32 protrudes from the lower side of pedal 30 and a tread-like surface is formed by grooves 34. Tapered leading section 24 includes slot 36 directed in a second direction $D_2$ which is positionally oriented relative to the first direction in which the foot pedal extends. As depicted in the preferred embodiments 20, 20', the first direction $D_1$ is diametrically opposed to the second direction $D_2$. It will be appreciated that directions $D_1$ and $D_2$ may be at right angles relative to one another. The positionality of these elements functions primarily to permit the aiming of the slot 36 toward the roots which are desired to be watered. Slot 36 is protected by a V-shaped deflector 38 which prevents soil from becoming packed into slot 36 when the stake 20 is pushed into the ground.

A second preferred embodiment is depicted in FIGS. 3A and 3B generally at 20'. Several modifications are made to this embodiment to simplify manufacture and enhance durability. Foot pedal 30' is strengthened by making the base 32' more substantial rather than simply a reinforcing ribs as in the first embodiment. As seen in FIG. 3A, the foot pedal of this embodiment is T-shaped in cross section. The tread is formed by a series of teeth 34' (that is, is formed by adding material rather than removing it). This makes the pedal 30' stronger and less likely to break off under normal usage.

In use, root-watering system 10 may be attached to a device with a manually operated valve such as spray nozzle 11 and stake 20, 20' moved from plant to plant to water the roots by stepping on the foot pedal 30, 30' and operating the valve mechanism. By having the pedal extend in a particular direction $D_1$ (in the embodiments shown, away from the plant), the slot 36 will spray a water stream directly toward the plant's roots, minimizing the water and time necessary to water a particular plant or series of plants.

Various changes, alternatives and modifications will become apparent to a person of ordinary skill in the art after a reading of the foregoing specification. It is intended that all such changes, alternatives, and modifications as come within the scope of the appended claims be considered part of the present invention.

What is claimed is:

1. A root watering system for sequentially watering each of a plurality of plants by attaching said system to a hand-operable valve mechanism having an inlet end which is connected to a water supply and an outlet end, said system comprising:

a) a substantially rigid tube having an inlet end and an outlet end attached at said inlet end to said outlet end of said valve mechanism;

b) a watering stake having an inlet end attached to said outlet end of said rigid tube, a foot-operable pedal extending laterally outwardly from said watering stake adjacent its inlet end, and an outlet end including a tapered end section and a longitudinal egress slot extending along at least a portion of said tapered section diametrically opposite said foot-operable pedal to enable said egress slot to be precisely positioned, a generally V-shaped deflector positioned adjacent said egress slot to deflect soil away therefrom;

whereby said foot-operable pedal can be operated to force said tapered end section into a portion of soil adjacent a plant and then removed to permit sequential watering of a plurality of plant root systems.

2. The root watering system of claim 1 wherein said foot-operable pedal is generally T-shaped in cross section having a bi-directional laterally extending flange, a downwardly extending reinforcing rib and an upwardly exposed serrated foot-engagable ridge extending along an upper portion of said flange.

3. The root watering system of claim 1 wherein an outer diameter of said rigid tube is slightly smaller than an inner diameter of a portion of said stake.

4. A root watering stake for use in a combination root watering system which includes said stake, a rigid tube having an inside diameter and an outside diameter $d_1$ and a water supply, said stake comprising:

a) a first elongated, generally cigar-shaped portion having a first cylindrical section with an outside diameter $d_2$ and a tapering section which tapers to a bluntly pointed leading end;

b) a second cylindrical section abutting said first cylindrical section forming a juncture, said second cylindrical section having a larger outside diameter $d_3$ and an inside diameter $d_4$ slightly larger than $d_1$ to snugly receive an end of said rigid tube;

c) a foot-operable pedal extending laterally from said juncture in generally a first direction;

d) an exit slot extending longitudinally along at least a portion of said tapered section adjacent said bluntly pointed end and extending in a second direction which is diametrically opposed to said first direction;

whereby said root watering stake can be operated to force said tapered end section into a portion of soil adjacent a plant and then removed to permit sequential watering of a plurality of plant root systems.

5. The root watering system of claim 4 wherein said water supply comprises a hand-operable valve mechanism in the form of a pistol-type spray nozzle.

6. The root watering system of claim 5 wherein said water supply further comprises a garden hose attached to a spigot and to said hand-operable valve.

7. The root watering stake of claim 4 wherein said inside diameter $d_4$ of said first cylindrical section is slightly larger than the outside diameter $d_1$ of said rigid tube so as to fit snuggly thereon.

8. The root-watering stake of claim 4 further comprising a V-shaped barrier protecting the exit slot from being packed with soil upon initial insertion.

9. A root watering system for sequentially watering each of a plurality of plants by attaching said system to a hand-operable valve mechanism having an inlet end which is connected to a water supply and an outlet end, said system comprising:

a) a substantially rigid tube having an inlet end, being attached at its inlet end to said outlet end of said valve mechanism and having an outlet end;

b) a watering stake having an inlet end attached to said outlet end of said rigid tube, a foot-operable pedal extending laterally outwardly from said watering stake adjacent its inlet end, said watering stake being T-shaped in lateral cross section having a bi-directional laterally extending flange, a downwardly extending reinforcing rib and an upwardly exposed serrated foot-engagable ridge extending along an upper portion of said flange, and having an outlet end including a tapered end section and a longitudinal egress slot extending along at least a portion of said tapered section, said egress slot having a particular relative position with respect to said foot-operable pedal;

whereby said foot-operable pedal can be operated to force said tapered end section into a portion of soil adjacent a plant to permit sequential watering of a plurality of plant root systems.

10. The root watering system of claim 9 further comprising a generally V-shaped deflector positioned adjacent said egress slot to deflect soil away therefrom.

* * * * *